US009993017B2

United States Patent
Rhyu et al.

(10) Patent No.: US 9,993,017 B2
(45) Date of Patent: Jun. 12, 2018

(54) METHOD FOR ENHANCING SWEETNESS

(71) Applicant: KOREA FOOD RESEARCH INSTITUTE, Gyeonggi-do (KR)

(72) Inventors: Mee Ra Rhyu, Gyeonggi-do (KR); Hee Jin Son, Gyeonggi-do (KR); Yi Seul Kim, Gyeonggi-do (KR); Min Jung Kim, Seoul (KR); Myung Ji Jung, Daegu (KR)

(73) Assignee: KOREA FOOD RESEARCH INSTITUTE, Gyeonggi-Do (KR)

( * ) Notice: Subject to any disclaimer, the term of this patent is extended or adjusted under 35 U.S.C. 154(b) by 13 days.

(21) Appl. No.: 14/349,069

(22) PCT Filed: Nov. 23, 2012

(86) PCT No.: PCT/KR2012/009976
§ 371 (c)(1),
(2) Date: Apr. 1, 2014

(87) PCT Pub. No.: WO2013/077668
PCT Pub. Date: May 30, 2013

(65) Prior Publication Data
US 2014/0248411 A1    Sep. 4, 2014

(30) Foreign Application Priority Data

Nov. 23, 2011 (KR) ........................ 10-2011-0123194

(51) Int. Cl.
| A23L 1/236 | (2006.01) |
| A23L 27/00 | (2016.01) |
| A23L 27/30 | (2016.01) |
| A23L 27/50 | (2016.01) |

(52) U.S. Cl.
CPC ............ *A23L 1/2361* (2013.01); *A23L 27/30* (2016.08); *A23L 27/31* (2016.08); *A23L 27/88* (2016.08); *A23L 27/00* (2016.08); *A23L 27/50* (2016.08); *A23V 2200/16* (2013.01)

(58) Field of Classification Search
CPC ........ A23L 1/2361; A23L 27/88; A23L 27/30; A23L 27/31; A23L 27/00; A23L 27/50; A23V 2200/16

USPC .................................. 426/548, 634, 650
See application file for complete search history.

(56) References Cited

U.S. PATENT DOCUMENTS

2011/0091633 A1*  4/2011  Abelyan et al. .............. 426/589

FOREIGN PATENT DOCUMENTS

| EP | 0239540 | * | 8/1991 |
| JP | 2011011985 A |  | 1/2011 |
| KR | 10-1992-0003884 A |  | 3/1992 |
| KR | 10-2011-0040873 A |  | 4/2011 |

OTHER PUBLICATIONS

Yee, R., Dim Sum, 1977, Taylor & Ng, pp. 14, 16, 25, and 26.*
Homsey, C., Flavor Enhancement, 2001, (http://oascentral.naturalproductsinsider.com/RealMedia/ads/click_lx.ads/naturalproductsinsider.com/article/L34/1931014384/Top1/VirgoPub/INS_http://www.jarrowindustries.com).*
International Search Report for PCT/KR2012/009976.

* cited by examiner

*Primary Examiner* — Leslie A Wong
(74) *Attorney, Agent, or Firm* — Harness, Dickey & Pierce, P.L.C.

(57) ABSTRACT

A composition for enhancing sweetness includes glycan or glycopeptide derived from soy sauce. The composition has excellent sweetness enhancing properties, and particularly has a sweetening effect nearly the same as or better than those of conventional sweeteners and less calories in terms of nutritional characteristics. A sweetener composition includes the composition for enhancing sweetness and a sweetener. A food includes the composition for enhancing sweetness. A method for enhancing sweetness of a food, includes applying the sweetness enhancer composition to the food. The sweetness enhancer of the present invention is a natural product-derived substance, and contains, as an active ingredient, peptide separated from Korean traditional soy sauce aged over a long period of time, and therefore, may solve problems of conventional chemosynthesized sweetness enhancers, for example, side effects, foul taste or the like.

5 Claims, 13 Drawing Sheets

(A)

(B)

METHOD FOR ENHANCING SWEETNESS

CROSS REFERENCE TO RELATED APPLICATIONS AND CLAIM OF PRIORITY

This patent application is a National Phase application under 35 U.S.C. § 371 of International Application No. PCT/KR2012/009976, filed 23 Nov. 2012, which claims priority to Korean Patent Application No. 10-2011-0123194, filed 23 Nov. 2011, entire contents of which are incorporated herein by reference.

BACKGROUND

1. Field

The present invention relates to a sweetness enhancer composition containing a glycan derived from soy sauce.

2. Description of the Related Art

A sweet taste is preferred by humans, but a material containing sugar, such as sucrose having a sweet taste, has high calories and thus may cause metabolic disease, such as diabetes and obesity. For this reason, recent researchers have been trying to reduce sugar consumption by researching and developing artificial sweeteners that are free of calories. However, in many cases, since the sweetener free from calories gives off-tastes such as bitter taste, and the like, as well as the expected sweet taste, it fails to give a real sweet taste or enhance the sweet taste. Moreover, the existing artificial sweetener needs to be used at a high concentration in order to have its effect. Otherwise, the artificial sweetener has off-tastes such as a bitter taste, a metallic taste, a cool taste, and the like, besides the sweet taste, or its off-tastes are maintained for a long time, causing problems. In order enhance efficiency of the sweetener, the researchers have tried to develop taste components nearest to the sugar taste by combining existing sweeteners. Due to this, efforts on the development of sweetness enhancers capable of enhancing the sweet taste of the existing sugar have been made. Materials further enhancing the original sweet taste can have an effect of giving a high intensity of sweetness even with a low-concentration of sugar. Since this sweetness enhancer functions to enhance the intensity of a sweet taste with only a small amount of sweetener or sugar, it can reduce the amount of sugar contained in the food and thus can be applied to food or beverages with less calories.

It has been reported that with respect to the sense of taste in the tongue, chemical materials capable of stimulating taste receptors bind to G protein-coupled receptors, more specifically, a sweet taste receptor, a bitter taste receptor, and an umami taste receptor, to activate G-proteins, for example, Gα-gustducin, Gβ3, and Gγ13. Thereby, calcium flows into the cell through PLCβ2 and TRMP5 calcium channels, and thus cells having the taste receptors secrete a neurotransmitter to stimulate nerves involved in the taste and then transmit the sense of taste to the brain (Margolskee R F, *J Biol Chem* 277:1-4 (2002)).

During the last ten-year period, a sweet receptor for transmitting and controlling sweet taste has been found and cloned, and thus enhancers for further enhancing the sweet taste of sugar in relation to the receptor are being actively studied. Receptors recognizing sweet, umami, and bitter tastes structurally belong to a 7-transmembrane-domain G-protein coupled receptor (GPCR) family, but have a distinct structural differences. In recent molecular biological studies, mammalian taste receptors may be largely classified as Type 1 or Type 2. It has been known that Type 1 taste receptors belong to a family C of GPCR, and have a large extracellular region in which a ligand binds to the N-terminus, similar to meta-botropic glutamate receptors (mGluR) and γ-amino butyric acid B (GABAB) receptors closely related with calcium sensing (Nelson et al., 2001). These receptors are divided into three genes, T1R1, T1R2, and T1R3. It was found that T1R1 and T1R3 receptors act together as amino acid receptors and it was reported that T1R2 and T1R3 receptors act as sweet taste receptors. In the T1R2 heterodimer, a venus (VFT) flytrap domain is linked to a transmembrane domain (TMD), and a cystein rich domain (CRD) is linked to T1R2. Several tens of synthetic and natural sweeteners controlling the structures of these receptors haven been pharmacologically studied. The sweeteners acting on the transmembrane domain of T1R3 are cyclamate and neohesperidin dihydrochalcone (NHDC). Sucrose and sucralose bind to VFTs of T1R2 and T1F3 and aspartame binds to VFT of T1R2 (FIG. 1). As such, development methods for the sweetness enhancer have been specialized due to cloning of the sweet taste receptor.

The existing sweetness enhancers or artificial sweeteners bind to these receptors in various orientations to exhibit efficiency, but they may have off-tastes, or cause negative side effects.

Throughout this specification, many papers and patent documents are referenced and their citations are represented. The disclosures of the cited papers and patent documents are incorporated herein by reference in their entirety, and are to merely aid in the description of the invention disclosed herein.

SUMMARY

Described herein is a sweetness enhancer composition capable of having excellent sweetness enhancement, or an excellent sweetening effect better than those of the existing sweeteners, and fewer calories in terms of nutritional characteristics. In one aspect, a composition containing a glycan or glycopeptides derived from soy sauce or a soy sauce fraction activates a sweet taste receptor to thereby have a superior effect in enhancing the sweet taste.

Therefore, in one aspect, provided is a sweetness enhancer composition.

In another aspect, provided is a sweetener composition containing the sweetness enhancer composition of the invention and a sweetener.

In yet another aspect of the present invention, provided is a food containing the sweetness enhancer composition of the invention.

In one aspect of the invention, provided is a sweetness enhancer composition including a glycan represented by General Formula 1 below:

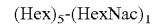  General Formula 1 where, Hex is hexose and HexNac is N-acetylhexosamine

In another aspect, provided is a sweetness enhancer composition capable of having excellent sweetness enhancement, or a sweetening effect better than those of the existing sweeteners, and fewer calories in terms of nutritional characteristics. More specifically, provided is a composition containing a glycan or glycopeptides derived from soy sauce or a soy sauce fraction that activates a sweet taste receptor to thereby have an excellent effect in enhancing the sweet taste.

DETAILED DESCRIPTION

Figure 1:
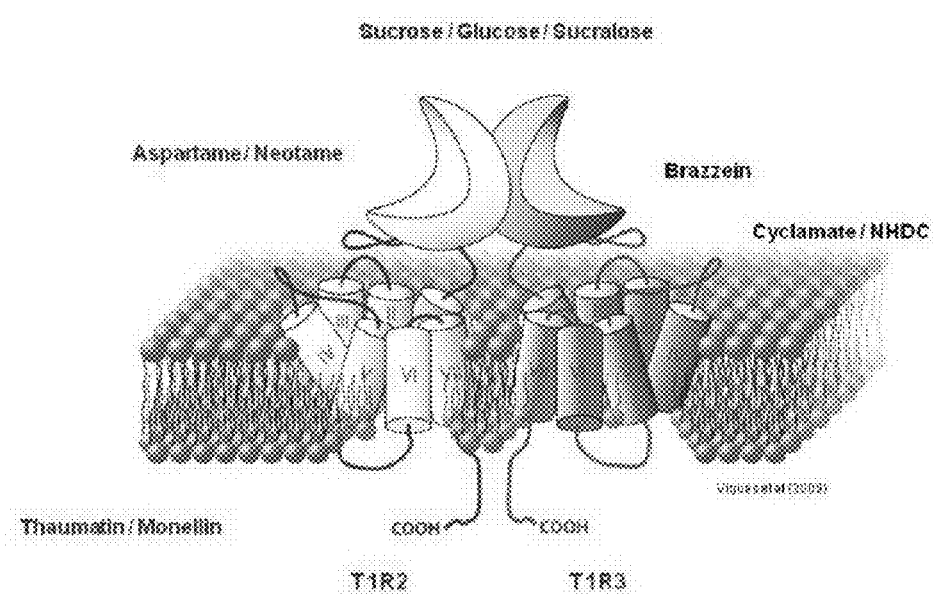
FIG. 1 shows a T1R2/T1R3 heterodimeric sweet taste receptor.

As used herein, the term "sweetness enhancer composition" means a composition capable of enhancing or intensifying sensitivity of the sweet taste. The term "sweetness enhancer composition" is a synonym for a sweet taste potentiator, a sweetness potentiator, or a sweetness intensifier. The sweetness enhancer composition provided herein enhances the sweet taste of the sweetener without giving its detectable sweet taste at an acceptable use concentration thereof, but may give a sweet taste at a higher concentration thereof.

According to one embodiment of the present invention, the hexose in General Formula 1, above, is mannose, glucose, galactose, fructose, fucose, or any combination thereof. In General Formula 1 above, N-acetylhexosamine is N-acetylglucosamine.

According to another embodiment of the invention, the glycan in General Formula 1, above, may be represented by Structural Formula 1, below:

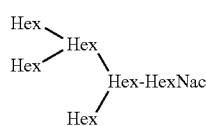

Structural Formula 1

According to yet another embodiment of the invention, the glycan in Structural Formula 1 may be linked to an amide nitrogen of an asparagine (Asn) amino acid residue of a peptide containing a methionine-asparagine (Met-Asn) amino acid sequence via the N-acetylhexosamine thereof.

According to one embodiment of the invention, the hexose in General Formula 1, above, may be mannose, glucose, galactose, fructose, fucose, or any combination thereof. In General Formula 1, above, N-acetylhexosamine is N-acetylglucosamine The peptide binding to the glycan of General Formula 1 includes a Met-Asn amino acid sequence, and preferably, the peptide essentially consists of the Met-Asn amino acid sequence, or more preferably, consists of the Met-Asn amino acid sequence. The term "essentially consisting of" used when the peptide sequence is cited is a term used to include a peptide in which one to ten, preferably one to five, one to three, one to two, or one amino acid is linked to the N-terminus, C-terminus, or N-terminus and C-terminus of the Met-Asn amino acid sequence.

According to another embodiment of the invention, the glycan used herein may be included in soy sauce or a soy sauce fraction, and may be isolated and obtained therefrom.

According to one aspect of the invention, provided is a glycan represented by Structural Formula 1 below:

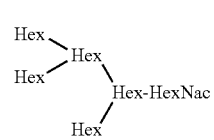

Structural Formula 1 where, Hex is hexose and HexNac is N-acetylhexosamine

As provided in the following examples, a glycan moiety of the glycopeptide isolated from the soy sauce, or aged soy sauce, has a sweetness enhancing effect.

According to still another aspect of the invention, provided is a sweetness enhancer composition including a glycopeptide fraction of soy sauce.

According to one embodiment of the invention, the glycopeptide fraction of the soy sauce may have a molecular weight of 500~10,000 Da.

According to another embodiment, the glycopeptide fraction of the present invention may be obtained by: (a) subjecting the soy sauce to centrifugation to remove a precipitate therefrom; and (b) subjecting the resultant material of step (a) to ultra-filtration to isolate a glycopeptide fraction having a molecular weight of 500~10,000 Da.

Obtaining the glycopeptide fraction will be described as follows. The soy sauce is subjected to centrifugation to remove a precipitate, and then a predetermined pressure (e.g., 60 psi) is applied thereto by using an ultra-filtration apparatus to thereby separate the glycopeptide fraction. An ultrafilter membrane (molecular weight cut-off at 10,000 Dalton) is used to separate material having a molecular weight of 10,000 Da or more and material having a molecular weight of 10,000 Da or less from each other, with the material having a molecular weight of 10,000 Da or more being removed. The solution containing glycopeptide having a molecular weight of 10,000 Da or less is re-subjected to ultra-filtration by using an ultrafilter membrane (molecular weight cut-off at 500 Dalton) to thereby remove material having a molecular weight of 500 Da or less and isolate a glycopeptide fraction having a molecular weight of more than 500 Da, but less than 10,000 Da.

The ultra-filtration may be performed via various methods known in the art. The ultra-filtration may be performed using an ultrafilter membrane having an appropriate molecular weight cut-off (MWCO). For example, an ultrafilter membrane having a MWCO of 500~10,000 Da may be used to perform the ultra-filtration. The ultra-filtration may exhibit a concentrating performance as well as a filtering performance.

The ultra-filtration may be performed after the original soy sauce is subjected to centrifugation. The centrifugation may be performed at 5,000-10,000 rpm.

According to one embodiment of the present invention, the sweetness enhancer composition of the present invention may activate a human sweet taste receptor. The sweet taste receptor is a taste receptor that is controllable by a sweet taste compound. The sweet taste receptor is a G protein-coupled receptor, and may be a human taste receptor type 1 member 2/human taste receptor type 1 member 3 (hT1R2/hT1R3).

Figure 5:
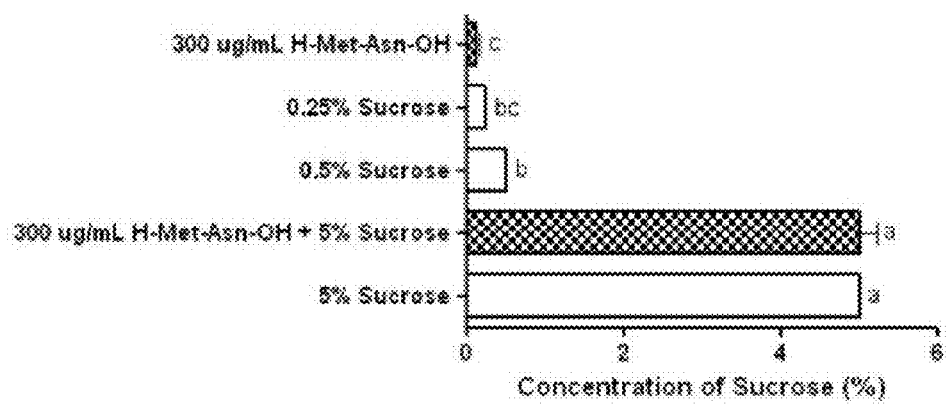
FIG. 5 is a graph showing sensory evaluation results of the Met-Asn peptide.

The sweetness enhancer composition of the present invention has effects on controlling a human sweet taste receptor (hT1R2/hT1R3) and activating a G-protein signaling cascade. The efficiency of the composition of the invention on the sweet taste receptor increases a sweet taste flavor recognized in a taste test. Therefore, the sweetness enhancer composition of the invention may be used as a substitute for sucrose, fructose, glucose, and other known natural saccharide-basic sweeteners or known artificial sweeteners (e.g., saccharine, cyclamate, aspartame, and the like), or a mixture thereof According to one embodiment of the invention, the Met-Asn peptide not binding to sugar has no sweetness effect. The sweetness of the Met-Asn peptide itself shows a sweet taste intensity of 0.13±0.04, which seems to be hardly sweet compared with that of 5% sucrose, a reference sample (FIG. 5). The sweetening effect of the fraction containing the Met-Asn peptide as disclosed herein is due to sugar structure binding.

Figure 6:
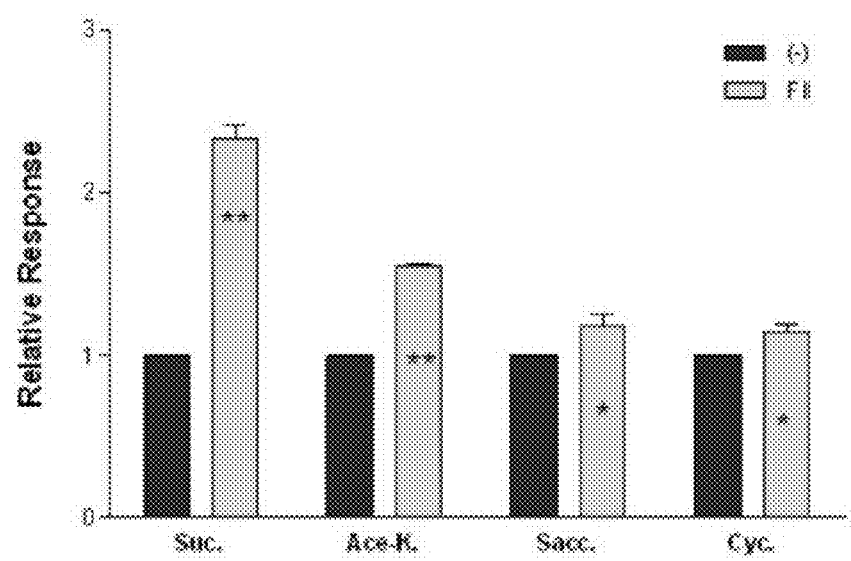
FIG. 6 is a graph showing a change in the calcium release amount by the FII fraction in human sweetness receptor expressing cells for various sweeteners. Suc.: sucrose, Ace-K.: acesulfame potassium, Sacc.: saccharine, Cyc.: cyclamate
Figure 7:
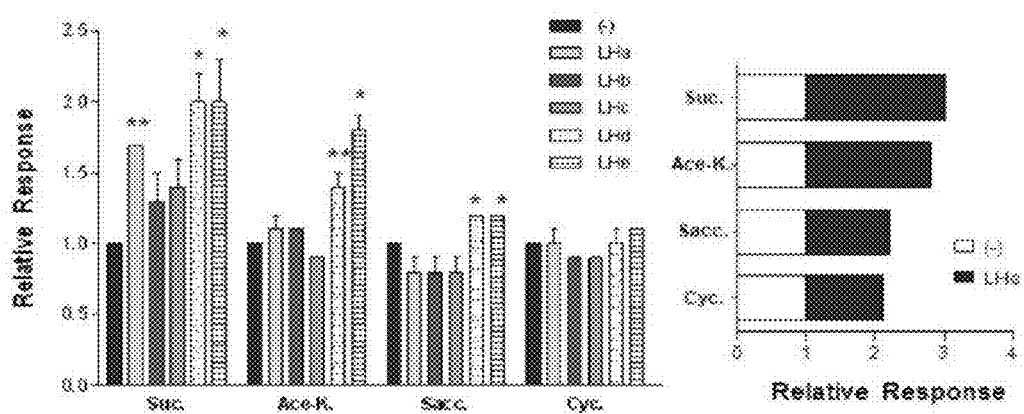
FIG. 7 is a graph showing a change in the calcium release amount by each of the five sub-fractions of FII in human sweetness receptor expressing cells for various sweeteners. Suc.: sucrose, Ace-K.: acesulfame potassium, Sacc.: saccharine, Cyc.: cyclamate
Figure 8:
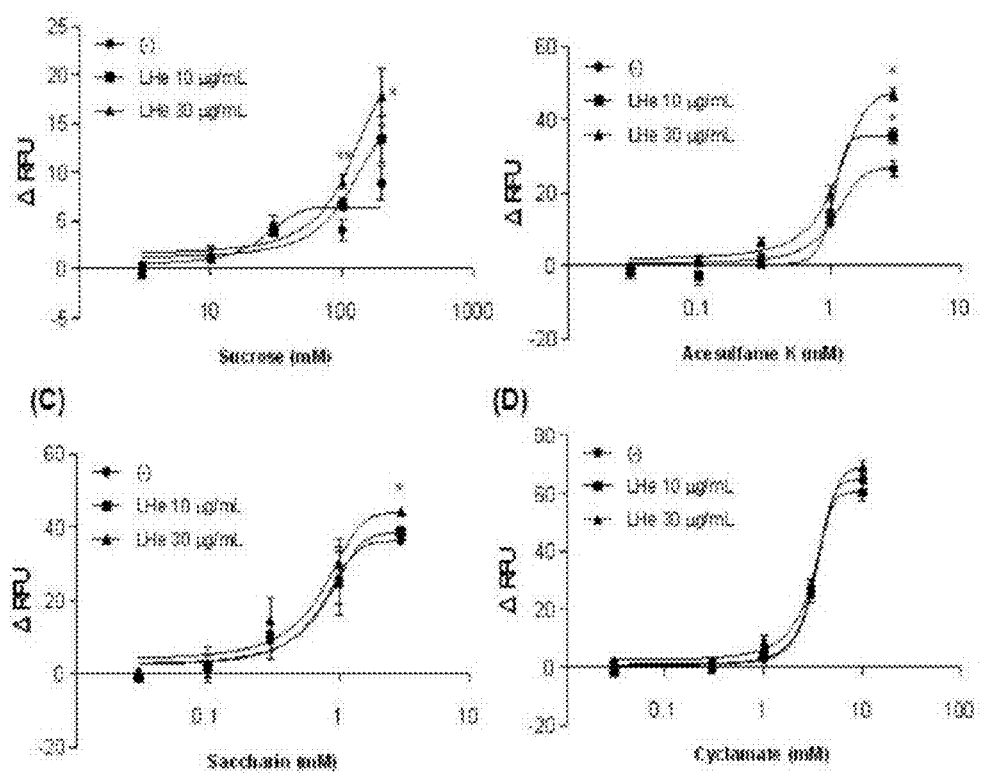
FIG. 8 shows graphs illustrating evaluation results on activation of the LHe fraction depending on the concentrations of sucrose, acesulfame potassium, saccharine, and cyclamate.

As provided in the following examples, the glycopeptide fraction (FII) isolated from the soy sauce increases the calcium concentration in the cell. Specifically, as the result that a cell line stably expressing hT1R2/hT1R3 is treated with the conventional sweetener, sucrose, acesulfame potassium, saccharine, or cyclamate, and then added with the FII fraction, an increase in calcium release may be confirmed when FII is added to four kinds of ligands. When FII is further added, the calcium release was significantly increased by about 2.3-fold for sucrose, and significantly increased by 1.5-fold and 1.2-fold for acesulfame potassium and saccharine, respectively (FIG. 6). In addition, as the result of confirming a change in calcium release for LHa, LHb, LHc, LHd, and LHe, which are respective sub-fractions of FII, when the sub-fractions are added to sucrose, acesulfame potassium, and saccharine, the calcium release was increased in a ligand-selective manner for LHd and LHe fractions (FIG. 7). The LHe fraction increased the calcium release in a concentration-dependent manner in cells treated with sucrose or acesulfame (FIG. 8).

According to one embodiment of the invention, the sweetness enhancer composition of the present invention may increase or enhance the sweet taste intensity of the sweetener composition to be higher than the sweet taste sensitivity of the sweetener composition having no sweetness enhancer.

Figure 10A:
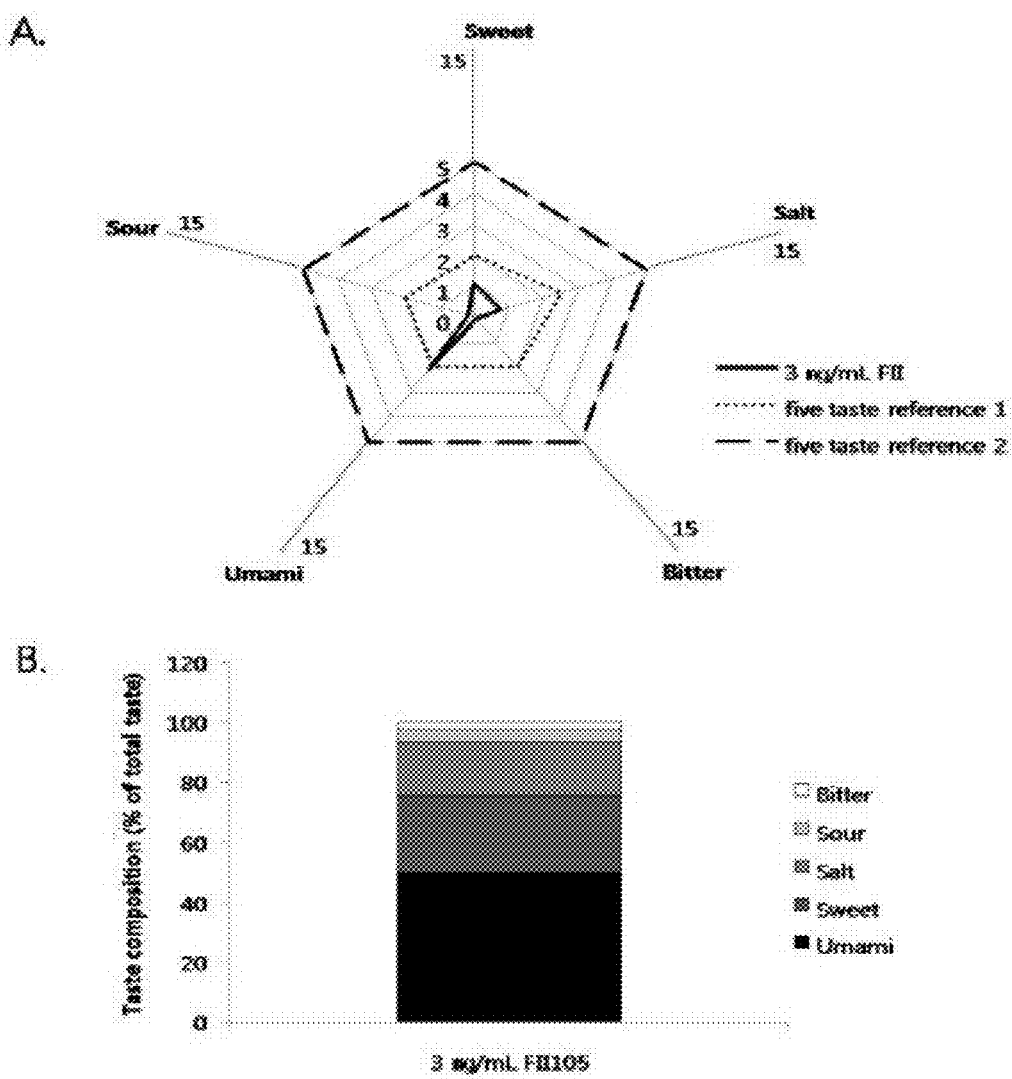
FIG. 10a shows quantitative sensory evaluation results of the FII fraction.
Figure 10B:
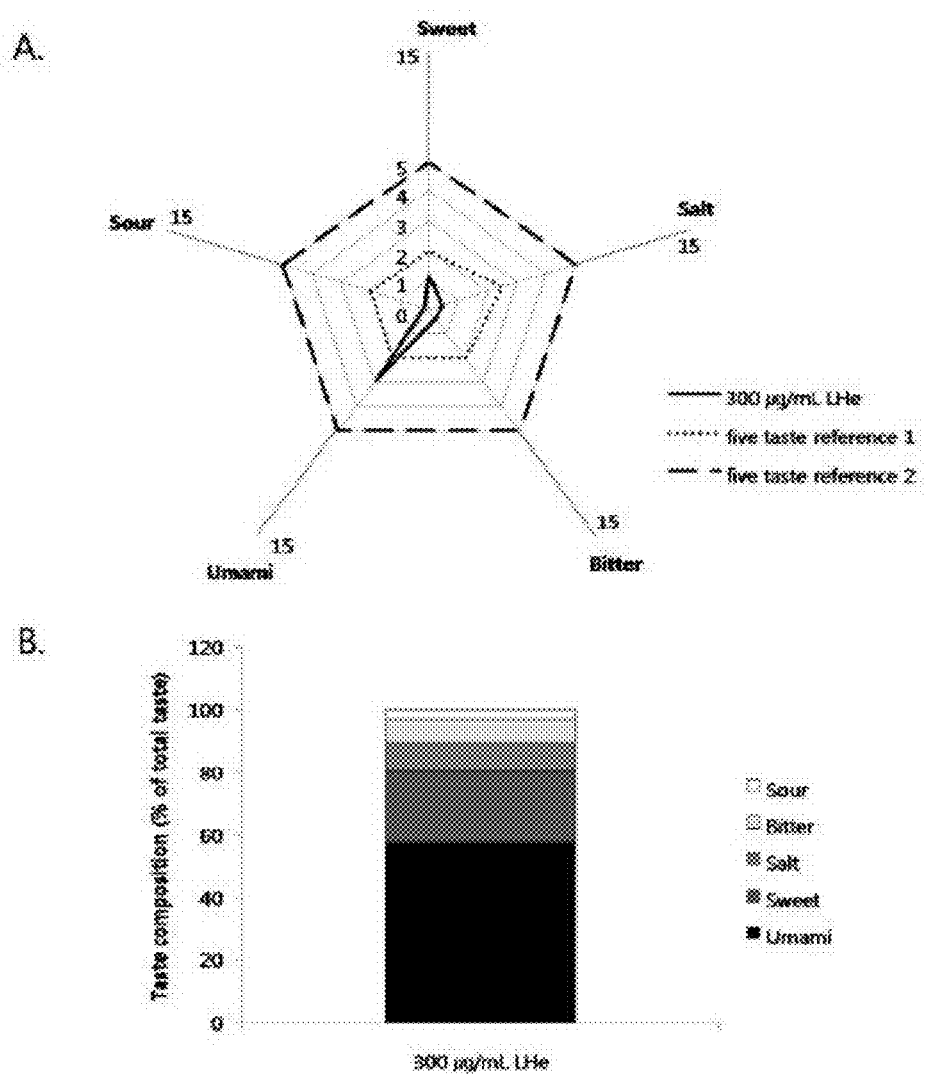
FIG. 10b shows quantitative sensory evaluation results of the LHe sub-fraction.

According one aspect of the invention, the basic tastes of the FII fraction showed that the umami taste intensity was the highest (2.13±0.31), and then the sweet taste intensity 1.08±0.20, the salty taste intensity 0.78±0.20, and then the sour and bitter taste intensities 0.17±0.06 and 0.10±0.05, respectively (panel A in FIG. 10A). It may be confirmed that, assuming a total of the taste intensities is 100%, the taste of the FII fraction has umami, sweet, salty, sour, and bitter tastes of 50%, 25.49%, 18.14%, 3.92%, and 2.45%, respectively, in that order (panel B in FIG. 10A). As for the sub-fraction of FII, the umami taste intensity was the highest (2.92±0.50), followed by the sweet taste intensity (1.15±0.15), and the salty taste intensity (0.46±0.21) and the bitter taste intensity (0.38±0.19) do not have a large difference therebetween, and the sour taste intensity (0.15±0.09) was hardly exhibited (FIG. 10B).

Figure 11:
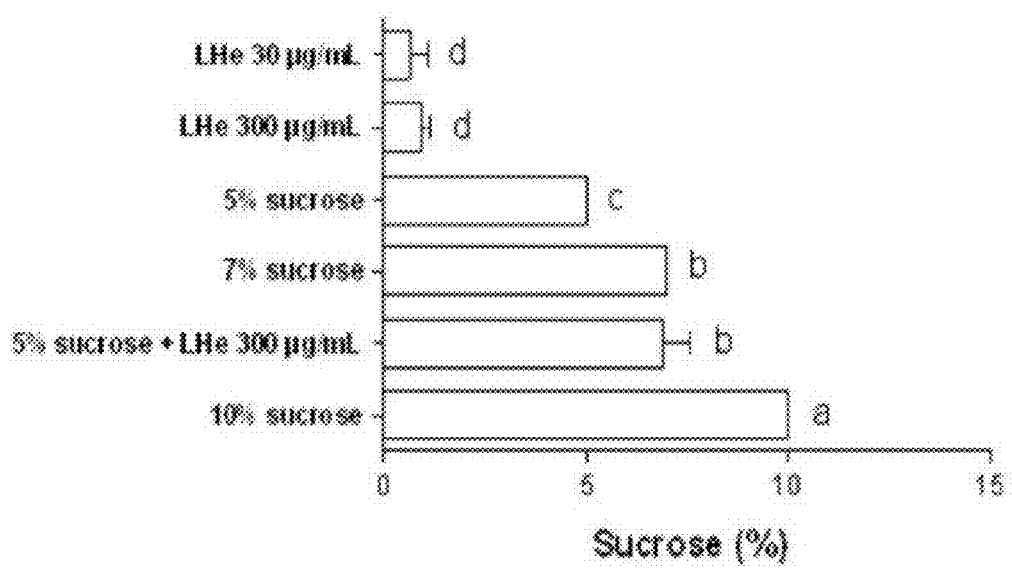
FIG. 11 is a graph showing sweetness enhancement effects of sucrose solutions and an LHe-sucrose solution.

In addition, in order to more accurately understand the sweetness enhancement effect of LHe, 2, 5, 10, and 15% sucrose solutions were used as sweet taste reference samples. An LHe solution and an LHe+5% sucrose solution were presented as samples, and sweet taste intensities thereof were measured by a 15-point scale method. The results confirmed that the sweet taste intensity of the LHe+5% sucrose solution (6.91±0.62) was significantly increased as compared with the sweet taste intensity (5.00±0.00) of the 5% sucrose reference sample (FIG. 11). As proved in the following examples, the addition of the LHe solution to the conventional sweetener leads to a sweetness enhancement effect.

According to still another aspect of the invention, provided is a sweetener composition including the sweetness enhancer composition of the present invention and a sweetener.

As used herein, the term "sweetener composition" means a combination material including the sweetness enhancer composition and at least one kind of sweetener.

The sweetness enhancer composition of the invention may be used to increase the sweet taste or sensitivity of any appropriate sweetener. The sweetener composition of the present invention may include a carbohydrate sweetener, a natural sweetener, a synthetic sweetener, or any combination thereof.

The sweetener composition provided herein includes an effective amount of sweetness enhancer composition therein. The effective amount of sweetness enhancer composition means an amount enough to increase or enhance the taste intensity of the sweetener composition to be higher than the sweet taste sensitivity of a sweetener composition having no sweetness enhancer composition. For example, the sweetness enhancer composition may be included in the overall sweetener composition in a concentration of 10~500 µg/mL, 30~300 µg/mL, and 30~100 µg/mL.

The carbohydrate sweetener usable herein includes sucrose, fructose, glucose, erythritol, maltitol, lactitol, sorbitol, mannitol, xylitol, D-tagatose, trehalose, galactose, rhamnose, cyclodextrin, ribulose, threose, arabinose, xylose, lyxose, allose, altrose, mannose, idose, lactose, maltose, invert sugar, isotrehalose, neotrehalose, palatinose, isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, xylo-oligosaccharides, gentio-oligoscaccharides, galacto-oligosaccharides, sorbose, nigero-oligosaccharides, fructo-oligosaccharides, maltotetraose, maltotriol, malto-oligosaccharides, lactulose, melibiose, raffinose, rhamnose, ribose, isomerized liquid sugars (e.g., high fructose cone/starch syrup, coupling sugar, soy-oligosaccharide, and glucose syrup). Preferable are sucrose, fructose, glucose, erythritol, and maltitol, and most preferable is sucrose.

As used herein, the term "natural sweetener" means a naturally found sweetener, which may be present in one or a combination of a raw type, an extracted type, a refined type, or any other type. The natural sweetener characteristically has higher sweetness potency, but fewer calories than sucrose, fructose, or glucose.

The natural sweetener usable herein includes rebaudioside A, rebaudioside B, rebaudioside C, rebaudioside D, rebaudioside E, rebaudioside F, dulcoside A, rubusoside, stevia, stevioside, mogroside IV, mogroside V, Luo Han Guo sweetener, siamenoside, monatin and its salts (e.g., monatin SS, RR, RS, SR), curculin, glycyrrhizic acid and its salts, thaumatin, monellin, mabinlin, brazzein, hemandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, and abrusoside A, cyclocarioside I.

As used herein, the term "synthetic sweetener" means any composition that is not found in nature and characteristically has higher sweetness potency, but fewer calories than sucrose, fructose, or glucose.

The synthetic sweetener usable herein includes sucralose, acesulfame potassium, aspartame, alitame, saccharine, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, and salts thereof. Preferable are sucralose, acesulfame potassium, aspartame, alitame, and saccharine, and most preferable are acesulfame potassium and saccharine.

According to still yet another aspect of the invention, provided is a food including the sweetness enhancer composition of the present invention.

Since the food of the present invention includes the above-described sweetener composition, descriptions of overlapping contents between the two are omitted for clarity.

The food of the invention means a composition that can be taken through the mouth, and includes meat products, dairy processed products, ready-to-eat foods, fermented foods, and noodles, without limitation. More specifically, the food of the invention includes non-carbonated and carbonated beverages, for example, cola, ginger ale, soda, powder-type non-alcoholic beverages; juice derived from fruit or vegetable, or fruit juice including fresh fruit juice; sports drinks; beverages similar to water (e.g., water containing natural or artificial flavor); teas or taste-type beverages (e.g., coffee, cocoa, black tea, green tea, oolong tea, etc.); milk ingredient-containing beverages (e.g., milk beverages, milk ingredient-containing coffee, cafe au lait, milk tea, fruit milk drinks, drinkable yogurt, lactic acid bacteria drinks, etc.); dairy products; bread products; desserts (e.g., yogurt, jelly, drinkable jelly, pudding, Bavarian cream, blancmange, cakes, brownies, moose, etc.); frozen foods; cold confection (e.g., ice cream, ice milk); common confection (e.g., cakes, crackers, biscuits, etc.); rice cakes and snacks; sauces, such as fruit flavor sauce and chocolate sauce; edible gels; jams, such as strawberry jam and marmalade jam; processed agricultural products, livestock products, or seafood products; processed meat products (e.g., sausages, etc.); retort pouches; snacks; and cereal products.

According to another aspect of the invention, provided is a method for enhancing sweetness of a food, the method comprising: (a) selecting a food; and (b) applying the sweetness enhancer composition of the invention to the food.

Since the present invention includes the sweetness enhancer composition of the invention, descriptions of overlapping contents between the two are omitted for clarity.

The food of the present invention includes any food known in the art, and for example, includes natural foods, meat foods, dairy products, ready-to-eat foods, fermented foods, noodles, meat (including raw meat, cooked meat, and dried meat), vegetables (including raw vegetables, pickles, cooked vegetables, and dried vegetables), fruits (including fresh fruit, cooked fruits, and dry fruits), cereals (including dried cereals and bread), processed food (including dry, canned sauce, and soup) and snacks, without limitation.

The sweetness enhancer composition of the present invention is applied to the food, thereby enhancing the overall sweet taste of the food and thus substituting for or reducing sugar and chemical sweetener used for the purpose of enhancing the sweet taste of the food, so that there can be provided an excellent food in terms of taste and nutritional characteristics.

According to another aspect of the invention, provided is a method for enhancing sweetness of a food, the method including applying a composition having a glycan to the food, the glycan being represented by General Formula 1 below:

$(Hex)_5—(HexNac)_1$            General Formula 1 where, Hex is hexose and HexNac is N-acetylhexosamine

According to one embodiment of the invention, the glycan in General Formula 1 above may be represented by Structural Formula 1, below:

Structural Formula 1

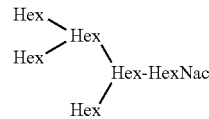

According to one embodiment of the invention, the glycan in Structural Formula 1 may be linked to amide nitrogen of an Asn amino acid residue of a peptide containing a Met-Asn amino acid sequence via N-acetylhexosamine thereof.

According to one embodiment of the present invention, the hexose in General Formula 1 above may be mannose, glucose, galactose, fructose, fucose, or any combination thereof. In General Formula 1 above, N-acetylhexosamine is N-acetylglucosamine.

The peptide binding to the glycan of General Formula 1 includes a Met-Asn amino acid sequence, and preferably, the peptide essentially consists of the Met-Asn amino acid sequence, or more preferably, consists of the Met-Asn amino acid sequence. The term "essentially consisting of" used when the peptide sequence is cited is a term used to include a peptide in which one to ten, preferably one to five, one to three, one to two, or one amino acid is linked to the N-terminal, C-terminal, or N-terminal and C-terminal of the Met-Asn amino acid sequence.

According to one embodiment of the present invention, the glycan used herein may be included in soy sauce or a soy sauce fraction, and may be isolated and obtained therefrom.

According to another aspect of the invention, provided is a method for enhancing sweetness of a food, the method including applying a composition including a glycopeptide fraction of a soy sauce to the food.

According to one embodiment of the present invention, the glycopeptide fraction of the soy sauce may have a molecular weight of 500~10,000 Da.

According to one embodiment, the glycopeptide fraction of the present invention may be obtained by: (a) subjecting the soy sauce to centrifugation to remove a precipitate therefrom; and (b) subjecting the resultant material of step (a) to ultra-filtration to isolate a glycopeptide fraction having a molecular weight of 500~10,000 Da.

According to one embodiment of the invention, the sweetness enhancer composition of the present invention may activate a human sweet taste receptor. The sweet taste receptor is a taste receptor that is controllable by a sweet taste compound. The sweet taste receptor is a G protein-coupled receptor, and more preferably human taste receptor type 1 member 2/human taste receptor type 1 member 3 (hT1R2/hT1R3).

According to another aspect of the invention, provided is a method for enhancing sweetness of a food, the method including applying a sweetener composition to the food, the sweetener composition including:

(a) a composition including a glycan represented by General Formula 1 below or a composition including glycopeptide fraction of soy sauce:

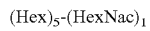
(Hex)$_5$-(HexNac)$_1$    General Formula 1 where, Hex is hexose and HexNac is N-acetyl-hexosamine, and (b) a sweetener.

Characteristics and advantages of the present invention are summarized as follows:

(a) Provided herein is a sweetness enhancer composition including a glycan isolated from soy sauce.

(b) Provided herein is a sweetness enhancer composition capable of having excellent enhancement, or a sweetness effect better than those of the existing sweeteners, and having fewer calories in terms of nutritional characteristics.

(c) Provided herein is a sweetener composition including a sweetness enhancer composition and a sweetener.

(d) Provided herein is a food including a sweetness enhancer composition and a method for enhancing sweetness of a food.

(e) Since the sweetness enhancer of the invention includes, as an effective ingredient, a glycan or glycopeptides isolated from long-aged Korean traditional soy sauce, which is a material derived from a natural substance, it can solve problems of the existing chemically synthesized sweetness enhancers, for examples, causing negative side effects, inducing off-tastes, and the like.

Hereinafter, the present invention will be described in detail via exemplary embodiments. These embodiments are only to aid in illustrating the invention more specifically, and it will be apparent to those skilled in the art that the scope of the present invention is not limited by these embodiments.

EXAMPLES

Materials and Methods

Figure 2:
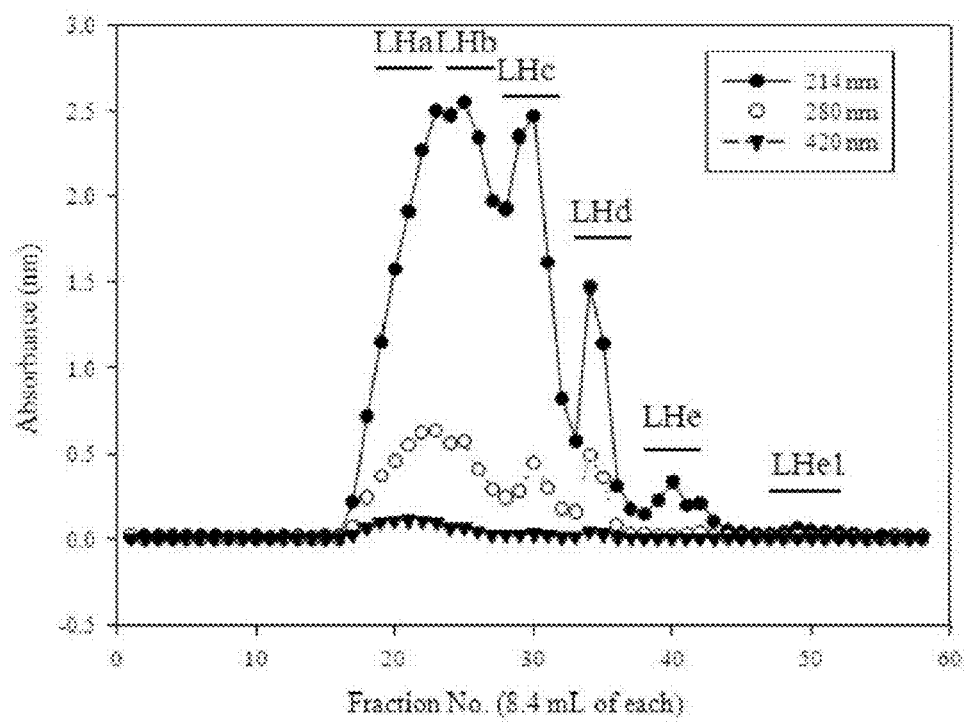
FIG. 2 is a graph showing a sugar-binding peptide fraction (FII) obtained from soy sauce through chromatography.

Isolation of Sugar-Binding Peptide Fraction LHe from Long-Aged Korean Traditional Soy Sauce The original soy sauce obtained through immersing in a traditional manner and aging for 4 hours was subjected to centrifugation at 9,000 rpm for 15 minutes at 4° C. to remove a precipitate. Then, an ultra-filtration apparatus (Model No. 8400) from the Amicon Company (Beverly, Mass., USA) was used to apply a pressure of 60 psi thereto, to separate peptide fractions. Ultrafilter membrane YM-10 (molecular weight cut-off 10,000 Dalton) from the Millipore company (Bedford, Mass.) was used to separate the peptide fractions into a material having a molecular weight of 10,000 Da or more and a material having a molecular weight of 10,000 Da or less, and then the material having a molecular weight of 10,000 Da or more was removed. The solution containing peptides having a molecular weight of 10,000 Da or less was again subjected to ultra-filtration by using ultrafilter membrane YC-05 (molecular weight cut-off 500 Dalton) to thereby remove a material having a molecular weight of 500 Da or less and thus isolate a glycopeptide fraction having a molecular weight of more than 500 Da, but less than 10,000 Da. This fraction was freeze-dried to be a powder, which was then dissolved in 20% ethanol, and then subjected to chromatography with Sephadex LH20columns (Φ1.9×150 cm) while 20% ethanol was used for elution (FIG. 2). The experiment was conducted in a low-temperature room (4~10° C.) in order to prevent denature of the peptides due to the temperature, and the freeze-dried powder state sample was maintained in a desiccators and used for the experiment.

Analysis on Structure

For analysis on structure, respective peaks separated by HPLC were treated with PNGase F, and then were fractionated into peptides and N-glycan. Then, the N-glycan was again fractionated into neutral glycan and S-glycan (sialic acid).

Human hT1R2/hT1R3 Receptor Stably Expressing Cell Line

The hT1R2/hT1R3 stably expressing cell line used in the invention was constructed by using the Flp-In pcDNA5/FRT Complete System (Invitrogen) according to the manufacture's indication. The entire coding regions of hT1R2, hT1R3, chimera G-protein α-subunit, and hGα16gust44 were cloned into the pcDNA5/FRT vector by using 6-nucleotide mutation, and this construct was sequenced by the ABI 130 or 310 DNA generatic analyzer (Applied Biosystems). Flp-In 293 cells cultured in Dulbecco's modified Eagle's medium (DMEM) with 10% fetal bovine serum at 37° C. were transfected with the construct plasmid and pOG44 by using Lipofectamine 2000 (Invitrogen), and then, after 24 hours, selectively treated with 100 μg/mL of hygromycin-B (Invitrogen), followed by further culturing for 2~3 weeks. After that, only antibiotic-resistant cells were collected, and then their response on sweeteners was measured, followed by again culturing, to thereby prepare a stable cell line.

Measurement on Intercellular Calcium Amount (Using FILPR System)

The hT1R2/hT1R3 receptor belongs to the GPCR family, which has a deep relation with sensing of calcium when being stimulated in cells. Therefore, in order to verify whether LHe acts on the hT1R2/hT1R3 receptor, HEK293 cells stably expressing hT1R2/hT1R3 were used to measure the intercellular calcium amount. It was verified whether the increase in the calcium amount by each ligand was greater than the increase in the calcium amount by addition of LHe, by simultaneously treating the cells with saccharine, sucrose, or acesulfame potassium, which is the existing ligand that acts on the hT1R2/hT1R3 receptor to give the sweet taste, and LHe (10 μg/mL or 30 μg/mL).

The intercellular calcium amount was measured by using FlexStationTMIII (Molecular Devices, Sunnyvale, Calif., USA). The hT1R2/hT1R3 receptor stably expressing cell line was dispensed at a density of 100,000 cells per well into 96-well plate 24 hours before measurement. After 16 hours, the cells were washed with a buffer (140 mM NaCl, 10 mM HEPES, 2 mM CaCl$_2$.2H$_2$O, 2 mM EGTA, 1 mM MgCl$_2$.6H$_2$O, 10 mM glucose, and 5 mM KCl), and then were treated with calcium 4 (Molecular Devices, Eugene, Oreg., USA) as an indicator for measuring a change in calcium amount, followed by reaction at 27° C. for 45 minutes total time (30 minutes+15 minutes). The resultant cells were treated with LHe (10 µg/ml or 30 µg/ml) and each ligand according to the concentration thereof, and absorbance measurement for each well was conducted for 120 seconds at 485 nm and 527 nm. The change in intercellular calcium amount was represented as ΔRFU, and then was analyzed by using the Softmax software (Molecular devices, USA).

Sensory Evaluation

Sensory evaluation was conducted to more accurately show sensory characteristics of basic tastes, that is, sweet, salty, bitter, sour, and umami tastes. In the five basic tastes, references for sweet taste (sucrose, 2% 2 points, 5% 5 points), salty taste (sodium chloride, 0.2% 2.5 points, 0.35% 5 points), bitter taste (caffeine, 0.05% 2 points, 0.08% 5 points), umami taste (MSG, 0.02% 2 points, 0.04% 5 points), sour taste (citric acid, 0.05% 2 points, 0.08% 5 points) were established. The taste intensity of each reference sample was presented to have a scale point as set forth above, out of 15 points, according to the spectra of intensity scales for descriptive analysis of Meilgaard et al. (Meilgaard M et al., Sensory evaluation techniques. CRC Press, Inc., Boca Paton, Fla., USA. p 39-112 (1987)). The LHe solution (300 µg/mL) was used as a sample for descriptive analysis, and the intensities of basic tastes in the sample were displayed within the scales of 15 points by being compared with those of the reference samples.

In order to more accurately verify the sweet taste enhancement effect of LHe, 2, 5, 10, and 15% sucrose solutions were used as sweet taste reference samples. An LHe solution (300 µg/mL) and an LHe+5% sucrose solution were presented as samples, and sweet taste intensities thereof were measured by a 15-point scale method. Here, the sweet taste intensities of sweet taste reference samples, 2, 5, 10, and 16% sucrose solutions were presented to be 2, 5, 10, and 15 points, respectively, according to the method of Meilgaard et al.

In order to verify specificity of the sweet taste enhancement effect of LHe, a sweetener except sucrose was used as a sweet taste reference sample. In the present experiment, sodium cyclamate was used, and 0.056% and 0.14% solutions thereof were prepared while sweet taste intensities thereof were presented to be 2 points and 5 points, respectively. An LHe (300 µg/mL) solution and an LHe (300 µg/mL)+0.14% sodium cyclamate solution were used as samples, and sweet taste intensities thereof were measured by a 15-point scale method. In the experiment, panels well trained in the basic tastes participated, and the presented samples were maintained at room temperature. After having a taste of the reference sample, the mouth was rinsed with water, and then after having a taste of the sample, intensity of each basic taste was evaluated.

Isolation of Sugar-Binding Peptide Fraction LHe from Long-Aged Korean Traditional Soy Sauce The soy sauce naturally aged for 5 years was subjected to ultra-filtration to obtain a fraction having a molecular weight of 500<M.W.<10,000, which was called FII. This was again separated into molecular weight-specific sub-fractions by gel permeation chromatography (GPC), and called LHa, LHb, LHc, LHd, and LHe in a descending order of molecular weight (FIG. 2).

Figure 3:
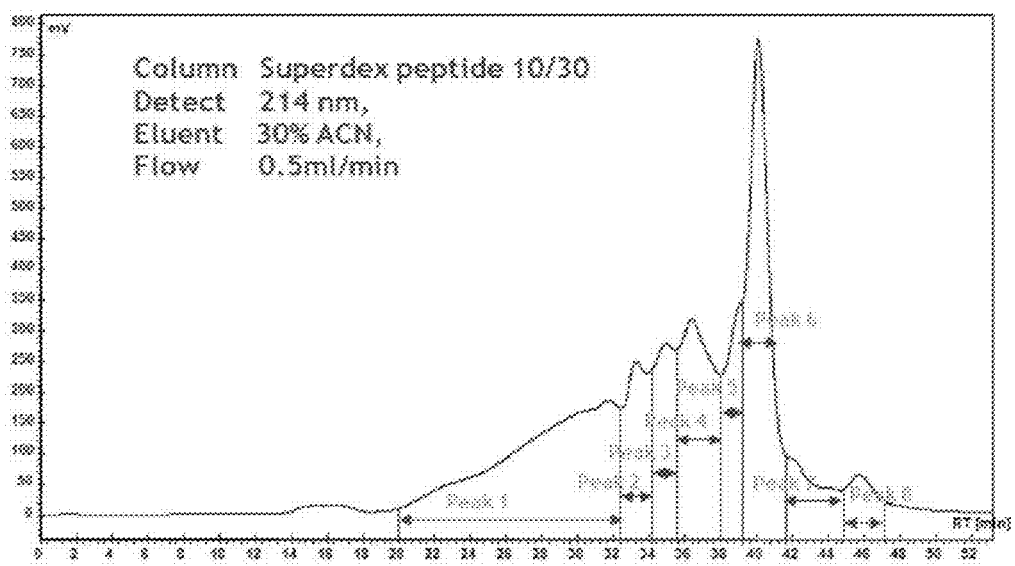
FIG. 3 is a graph showing the HPLC analysis results of LHe, a sub-fraction of FII.
Figure 4:
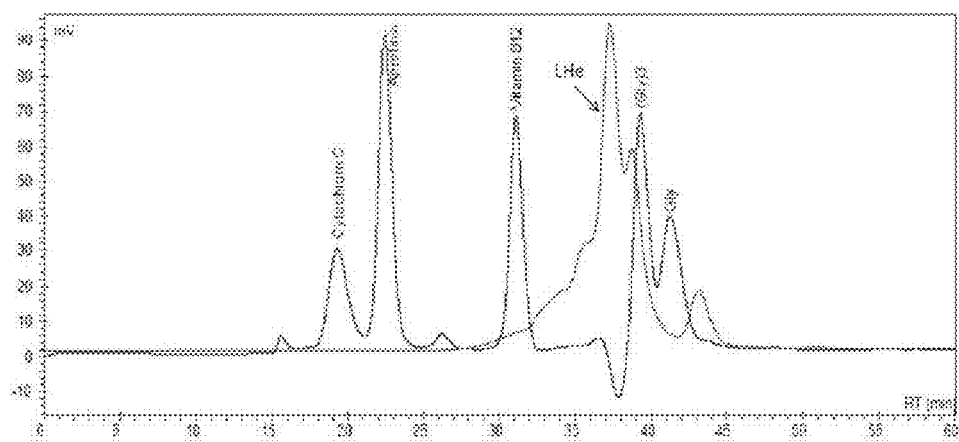
FIG. 4 shows a chromatogram of LHe, which is compared with molecular weight reference materials to estimate the molecular weight of LHe.

A chromatogram pattern of LHe was confirmed by HPLC, and its molecular weight range was estimated by using cychrome C, aprotinin, vitamin B12, (Gly)$_3$, and glycine (FIG. 3). It was confirmed that the molecular weight of LHe is smaller than 1,855, but larger than 189.

Analysis on Structure of Active Ingredient Isolated from Korean Traditional Soy Sauce LHe confirmed as being an active fraction of FII was separated into peak 1, peak 2, peak 3, peak 4, peak 5, peak 6, peak 7, and peak 8 by LHPC (FIG. 3), and MALDI-TOFTOF-MS (AB Sciex Instruments, Ltd.) analysis was conducted for each peak. As the analysis result, the presence of glycan component was confirmed in peak 3, peak 6, peak 7, and peak 8. For analysis on structures of peak 3 and peak 6, each peak was treated with PNGase F, and then fractionated into peptides and N-glycan. Then, the N-glycan was again fractionated into neutral glycan and S-glycan (sialic acid). S-glycan was not confirmed and neutral N-glycan was mainly confirmed. As a result of investigating each glycan peak with respect to plant-derived glycan using Glycosuite program-GMF (updated in 2005, Agilent Technologies, Inc.), it was confirmed that a peak having a molecular weight of 1,054 was derived from soybean. This result was the same for peak 3 and peak 6. As a result of MSMS analysis (AB Sciex Instruments, Ltd.) of a sample of peak 3 (molecular weight: 1,054) [peak 3/LHe_1054 (1031)], the glycan Hex$_5$HexNAC$_1$ having Structural Formula 1 was identified. In this case, it was found that all five hexose molecules are mannose, and the HexNAC molecule was N-acetyl glucosamine. Meanwhile, as a result of MSMS analysis for other samples of peak 3, glycans to which several monosacharrides bind, such as, Pent$_1$Hex$_3$HexNAC$_2$, Pent$_1$Hex$_3$HexNAC$_2$Hex$_1$, and Hex$_4$HexNAC$_1$, were identified. The hexose molecule was mannose for most cases, and glucose, galactose, fructose, or fucose for fewer cases. The HexNAC molecule was glucosamine, and the pentose molecule was xylose for most cases, and arabinose and the like for fewer cases.

As a result of analysis of peak 6, the glycan Hex$_5$HexNAC$_1$ was identified as main glycan, similarly to the MSMS analysis result on the sample of peak 3 (molecular weight: 1,054) [peak 3/LHe_1054 (1031)].

Analysis on Peptides

Peptide analysis was conducted on each peak separated by HPLC. For peptide analysis of major peaks, peaks 3 and 6, shown in FIG. 3, each peak was treated with PNGase F, and then the sugar binding was removed. After that, LC-MS chromatograms thereof were compared and analyzed. The analyzing conditions were as follows. First, LC conditions were as follows. HPLC: Agilent 100 series (Agilent Technologies, Inc.), column: Zorbax 300SB-C 18 ((Agilent Technologies, Inc.), mobile phase: (A: H$_2$O/FA=100/0.2(v/v), B: acetonitrile/FA=100/0.2(v/v)), flow rate: 35 µl/min. MS conditions were as follows. MS equipment: Hybrid Quadrupole-TOF LC/MS/MS Spectrometer (AB Sciex Instruments, Ltd.), flow rate: 35 µl/min, scan range: m/z 200-2000, scan speed: 1 sec/scan.

As a comparison result of LC-MS chromatogram between peak 3 and peak 6, a distinct peak was commonly confirmed in peak 3 and peak 6, and its molecular weight was 293 Da [M+H]. In addition, as a result of sequencing the commonly shown peak having 293 Da [M+H] through MS/MS, it was thought that this is MD+□ (M: Methionine, D: Aspartic acid) (□ is assumed to be a sugar structure binding to peptide, but the sugar structure cannot be specified. As a result of sequencing the peptide, one Methionine+one Aspartic acid were confirmed, but the peptide chain is assumed to be longer). Since this result was obtained after the removal of sugar, it was determined that this is substantially an MN (M: Methionine, N: Asparagine) amino acid sequence (Asn is mistakenly recognized as Asp with an increase of 1 Da by allowing sugar to be separated therefrom and H+ to bind thereto). The molecular weight of the analyzed peptide was shown to not confirm the sequenced result (293 Da≠264 Da), but this material may be construed to be one where an unknown compound (or the previously analyzed sugar structure material) binds to the MN amino acid.

Sensory Evaluation on Met-Asn Peptide

Sensory evaluation was conducted to validate the role of Met-Asn peptide itself, without sugar binding thereto, on the sweetening effect. As a result, the sweetness of the Met-Asn peptide itself had a sweet taste intensity of 0.13±0.04, which was shown to have little sweet taste as compared with that of 5% sucrose as a reference sample, 5.00±0.00. When a Met-Asn peptide+5% sucrose solution was presented as a sample, the sweet taste intensity thereof was 5.00±0.23, which was not shown to have a significant difference from that of the 5% sucrose solution. Therefore, it was determined that the Met-Asn peptide did not exhibit a sweetness effect. Accordingly, the sweetness effect of the fraction containing the Met-Asn peptide may be due to the sugar structure binding.

Change in Calcium Amount by FII in Human Sweetness Receptor Expressing Cell for Various Sweeteners Cell based assay was used to measure a change in calcium concentration in the cell line stably expressing hT1R2/hT1R3 when 100 μg/mL (final concentration) of sugar-binding peptide fraction FII, which is isolated from the long-aged Korean traditional soy sauce, was added to acesulfame potassium (3 mM), aspartame (3 mM), cyclamate (10 mM), saccharine (1 mM), and sucrose (200 mM).

It may be confirmed that the calcium release was increased when 100 μg/mL of FII was added to the four kinds of ligands. It may be confirmed that the calcium release was significantly increased by about 2.3 fold for sucrose and about 1.5 fold and about 1.2 fold for acesulfame potassium and saccharine, respectively, as compared with that of each case where only the ligand itself was present (FIG. 6).

Change in Calcium Amount by Five Kinds of Sub-Fractions of FII in Human Sweetness Receptor Expressing Cell for Various Sweeteners The same experimental system was used to verify efficiency of sub-fractions of FII, LHa, LHb, LHc, LHd, and LHe (30 μg/mL each) (FIG. 7). It may be confirmed that LHd and LHe increased the calcium release in a ligand-selective manner for sucrose, acesulfame potassium, and saccharine, except cyclamate. In addition, LHa exhibited activity for only sucrose. It seems that LHd exhibiting activity in the invention had activity like LHe, but since fluorescent property of LHd itself is stronger than that of LHe, the experiment was conducted more focusing on LHe.

Evaluation on Concentration-Dependent Activity of Sucrose, Acesulfame Potassium, and Cyclamate Concentration-dependent activity of sucrose, acesulfame potassium, saccharine, and cyclamate was evaluated, and the calcium response thereof shown when 10 and 30 μg/mL of LHe was added thereto was confirmed. The tendency of concentration-dependent calcium increase by LHe was shown for sucrose and acesulfame potassium having concentrations of 0.03, 0.1, 0.3, 1, and 3 mM (final concentration), and for saccharine having concentrations of 0.001, 0.003, 0.01, 0.3, and 1 mM. However, such a tendency was not shown in case of 10 μg/mL of LHe. Like the previous results, the concentration-dependent reaction by ligand was confirmed for cyclamate, but a significant difference due to addition of LHe was not confirmed (FIG. 8).

Figure 9:
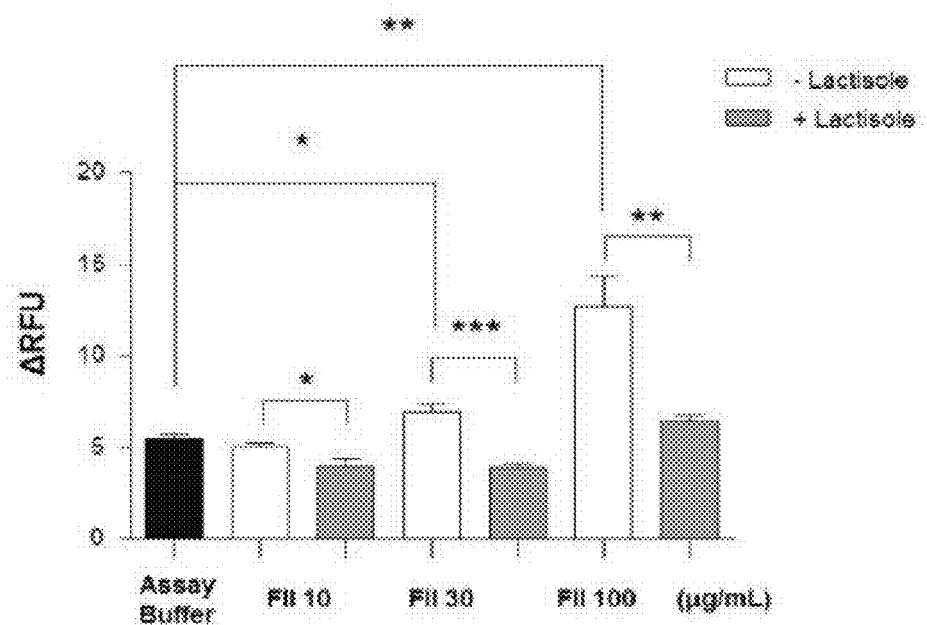
FIG. 9 shows graphs showing a change in the calcium release amount by lactisole in human sweetness receptor expressing cells for FII and LHe, respectively.
Figure 9:
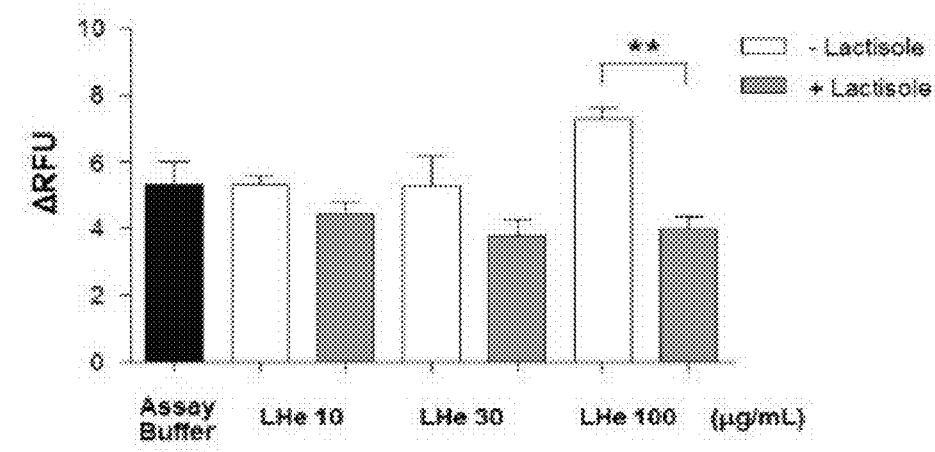

Change in Calcium Amount by Lactisole in Human Sweetness Receptor Expressing Cell for FII and LHe In order to verify whether the FII fraction and the LHe sub-fraction directly interact with hT1R2/hT1R3 by using lactisole known as a hT1R2/hT1R3 suppressor, cell based assay was used to measure a change in calcium concentration when FII and LHe (3, 10, or 100 μg/mL, each) were treated with 1 mM of lactisole. It may be confirmed that the calcium release was increased by concentrations when FII and LHe were added than when only an assay buffer was added. It may be significantly confirmed that, when 10, 30, or 100 μg/mL of FII was treated with lactisole, 79%, 57%, or 50% of FII activity was still present. It may be confirmed that, when 10, 30, or 100 μg/mL of LHe was treated with lactisole, activity of LHe was not reduced for 10 and 30 μg/mL thereof, but was partially reduced to 55% for only 100 μg/mL thereof (FIG. 9).

The meaning that the sweetness enhancement actions of FII and high-concentration LHe were partially reduced by the sweetness receptor suppressor, lactisole, is that a sweet taste material such as free sugar may be mixed therein. However, it is determined that FII had 50~79% of activity not affected by lactisole and the activity of low-concentration LHe was never affected by lactisole, and thus FII includes sub-fractions containing small molecules reacting with the sweetness receptor.

Sensory Evaluation of FII

Sensory evaluation was conducted to more accurately show sensory characteristics of basic tastes, that is, sweet, salty, bitter, sour, and umami tastes, of FII and LHe, in addition to the sweetness enhancement effect conducted by the cell based assay. 3 mg/mL and 300 μg/mL of FII and LHe solutions were used for descriptive analysis, and the intensities of basic tastes in each sample were shown within the 15-point scale by being compared with those of the reference samples.

As the profile test result of FII, in the basic tastes of 3 mg/mL of FII, the umami taste (2.13±0.31) was the highest, followed by sweet taste (1.08±0.20) and salty taste (0.78±0.20). The sour taste and bitter taste thereof was low, (0.17±0.06) and (0.10±0.05), respectively (FIG. 10A). It was confirmed that, assuming a total of the taste intensities is 100%, the FII fraction consists of umami, sweet, salty, sour, and bitter tastes of 50%, 25.49%, 18.14%, 3.92%, and 2.45%, respectively, in that order (n=18) (FIG. 10A). It was confirmed that main tastes of 3 mg/mL of FII were umami, sweet, and salty tastes.

Sensory Evaluation of LHe

In the basic tastes of LHe, the umami taste (2.92±0.50) was highest, followed by the sweet taste (1.15±0.15). The salty taste (0.46±0.21) and the bitter taste (0.38±0.19) did not have a large difference, and the sour taste (0.15±0.09) was little. The present experiment confirmed that LHe had high intensity of umami and sweet tastes (FIG. 10B).

In order to more accurately verify the sweet taste enhancement effect of LHe, 2, 5, 10, and 15% sucrose solutions were used as sweet taste reference samples. A 300 μg/mL LHe solution and a 300 μg/mL LHe+5% sucrose solution were presented as samples, and sweet taste intensities thereof were measured by a 15-point scale method. Here, the sweet taste reference samples, 2, 5, 10, and 16% sucrose solutions were respectively presented to be 2, 5, 10, and 15 points according to the method of Meilgaard et al. (1987).

Like the descriptive assay results of basic tastes, the 300 μg/mL LHe solution exhibited a sweet taste intensity of 1.05±0.23, which is lower than that of the 2% sucrose reference sample (2.00±0.00). Whereas, it was confirmed that the sweet taste intensity of the 300 μg/mL-LHe+5% sucrose solution was 6.91±0.62, which was significantly increased as compared with that of the 5% sucrose reference sample (5.00±0.00). When compared with the sucrose standard curve, the 300 μg/mL LHe solution had the same sweet taste intensity as the 0.92% sucrose solution, and the 300 μg/mL-LHe+5% sucrose had the same sweet taste intensity as the 7.14% sucrose solution. It seems that the sweet taste of the 300 μg/mL-LHe+5% sucrose solution is due to not a simple addition effect, but a synergic effect of sweet tastes of 300 μg/mL LHe and the 5% sucrose. Thereby, it is assumed that LHe is added to the food to increase the sweet taste of the food.

Verification on Sweetness Enhancement Effect of LHe

Figure 12:
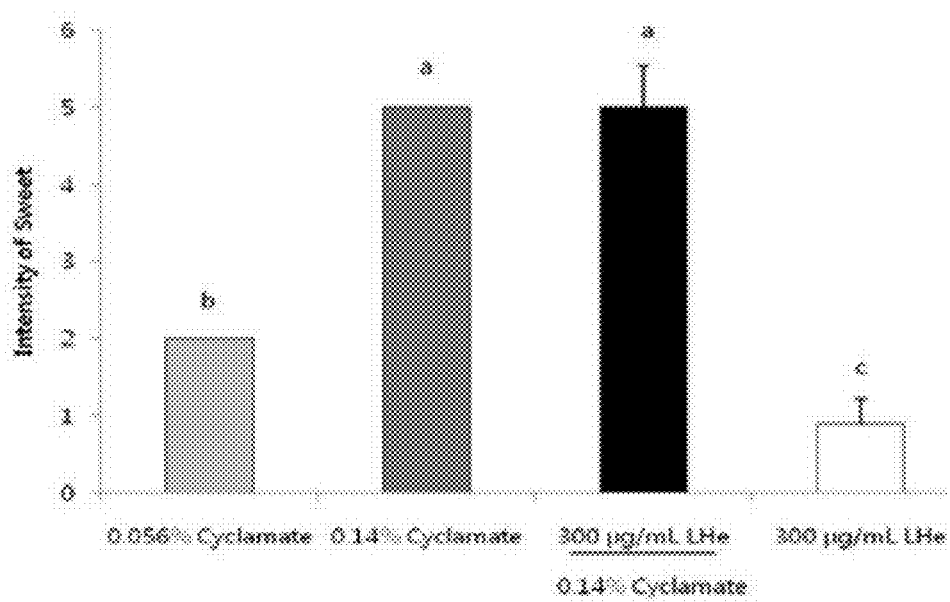
FIG. 12 is a graph showing sweetness enhancement effects of sodium cyclamate and LHe-sodium cyclamate.

In order to verify specificity of the sweet taste enhancement effect of LHe, a sweetener, except sucrose, was used as a sweet taste reference sample. In the present experiment, sodium cyclamate was used, and 0.056% and 0.14% of solutions thereof were prepared while sweet taste intensities thereof were presented to be 2 points and 5 points, respectively. A 300 μg/mL LHe solution and a 300 μg/mL-LHe+ 0.14% sodium cyclamate solution were used as samples, and sweet taste intensities thereof were measured by a 15-point scale method. The 0.056% cyclamate solution and the 0.14% cyclamate solution, as reference samples, presented sweet taste intensities of 2.00±0.00 and 5.00±0.00, respectively. While, the 300 μg/mL LHe solution exhibited a sweet taste intensity of 0.9±0.33. In addition, the 300 μg/mL-LHe+ 0.14% cyclamate solution exhibited a sweet taste intensity of 5.00±0.54. Considering that the 300 μg/mL-LHe+0.14% cyclamate solution had the same sweet taste intensity as the 0.14% cyclamate reference sample, the 300 μg/mL LHe does not exhibit an increase effect in the sweet taste when being added to cyclamate. From the above results, it is thought that LHe specifically has an increase effect in sweet taste for only sucrose (FIG. 12). Therefore, it is anticipated that LHe has a high degree of utilization as a material for controlling the sweet taste in a food industry.

Although the invention has been described in detail with reference to specific embodiments, it will be apparent to those skilled in the art that these embodiments and do not limit the scope of the invention. Thus, the scope of the invention will be defined by the appended claims and equivalents thereof.

The invention claimed is:

1. A method for enhancing sweetness of a food, the method comprising applying a composition comprising 30-500 μg/ml of a glycopeptide fraction of soy sauce to the food, wherein the glycopeptide fraction is obtained by:
   subjecting the soy sauce to centrifugation to remove a precipitate; and
   subjecting the precipitate-removed soy sauce to ultrafiltration to isolate a glycopeptide fraction having a molecular weight of 500 to 1855 Da.

2. The method of claim 1, wherein the composition activates a human sweet taste receptor.

3. The method of claim 2, wherein the human sweetness receptor is human taste receptor type 1 member 2 (hT1R2), human taste receptor type 1 member 3 (hT1R3), or hT1R2/hT1R3.

4. The method of claim 2, wherein the composition comprises 100-500 μg/ml of the glycopeptide fraction.

5. The method of claim 2, wherein the composition comprises 300-500 μg/ml of the glycopeptide fraction.

* * * * *